(12) United States Patent
Agarwala et al.

(10) Patent No.: US 8,996,480 B2
(45) Date of Patent: Mar. 31, 2015

(54) METHOD AND APPARATUS FOR OPTIMIZING DATA STORAGE

(75) Inventors: Sandip Agarwala, San Jose, CA (US); Luis Angel D. Bathen, San Jose, CA (US); Divyesh Jadav, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 13/100,323

(22) Filed: May 4, 2011

(65) Prior Publication Data
US 2012/0284239 A1   Nov. 8, 2012

(51) Int. Cl.
*G06F 17/30* (2006.01)
*G06F 3/06* (2006.01)

(52) U.S. Cl.
CPC .............. *G06F 3/0608* (2013.01); *G06F 3/061* (2013.01); *G06F 3/064* (2013.01); *G06F 3/0643* (2013.01); *G06F 3/067* (2013.01); *G06F 17/30153* (2013.01)
USPC ........................................................ 707/693

(58) Field of Classification Search
CPC ................................................ G06F 17/30135
USPC .................................................. 707/693, 812
See application file for complete search history.

(56) References Cited

U.S. PATENT DOCUMENTS

| | | | | |
|---|---|---|---|---|
| 5,124,987 A * | 6/1992 | Milligan et al. | ............. | 714/6.32 |
| 5,813,017 A * | 9/1998 | Morris | ................... | 1/1 |
| 6,253,246 B1 * | 6/2001 | Nakatsuyama | ............... | 709/233 |
| 7,603,529 B1 * | 10/2009 | MacHardy et al. | ........... | 711/162 |
| 8,285,681 B2 * | 10/2012 | Prahlad et al. | ................ | 707/640 |
| 8,402,004 B2 * | 3/2013 | Provenzano et al. | ......... | 707/692 |
| 8,854,433 B1 * | 10/2014 | Rafii | ............................... | 348/47 |
| 2002/0163964 A1 * | 11/2002 | Nichols | .................... | 375/240.03 |
| 2007/0124345 A1 * | 5/2007 | Heinz et al. | .................... | 707/204 |
| 2009/0083279 A1 * | 3/2009 | Hasek | ............................. | 707/10 |
| 2009/0150895 A1 * | 6/2009 | Pullo | ............................. | 718/104 |
| 2010/0161759 A1 * | 6/2010 | Brand | ............................ | 709/218 |
| 2010/0191783 A1 * | 7/2010 | Mason et al. | ................. | 707/822 |
| 2010/0235325 A1 | 9/2010 | Godil et al. | | |
| 2010/0281004 A1 * | 11/2010 | Kapoor et al. | ................ | 707/693 |
| 2011/0022812 A1 * | 1/2011 | van der Linden et al. | .... | 711/163 |
| 2011/0184934 A1 * | 7/2011 | Lakshminarayan et al. | .. | 707/718 |
| 2011/0320520 A1 * | 12/2011 | Jain | ................ | 709/203 |
| 2012/0120098 A9 * | 5/2012 | Faulkner et al. | ............... | 345/619 |
| 2012/0124016 A1 * | 5/2012 | Barsness et al. | ............... | 707/693 |
| 2012/0124307 A1 * | 5/2012 | Ashutosh et al. | ............. | 711/162 |
| 2012/0173822 A1 * | 7/2012 | Testardi et al. | ................ | 711/135 |

OTHER PUBLICATIONS

Miyamoto et al., Customizing Network Functions for High Performance Cloud Computing, Eighth IEEE International Symposium on Network Computing and Applications, 2009.

* cited by examiner

*Primary Examiner* — Noosha Arjomandi
(74) *Attorney, Agent, or Firm* — Lieberman & Brandsdorfer, LLC

(57) ABSTRACT

Embodiments of the invention relate to evaluation and storage of data in a computer system configured with a shared pool of resources. A multi-level adaptive compression technique is employed to minimize the cost of data storage based upon the type of data being stored and their access pattern. The costs of data storage include capacity, bandwidth, and compute cycles. Data is transformed local to a client in communication with the shared pool, local to the shared pool, or as a combination with a partial transformation local to the client and a partial transformation local to the shared pool.

19 Claims, 10 Drawing Sheets

METHOD AND APPARATUS FOR OPTIMIZING DATA STORAGE

BACKGROUND

This invention relates to processing application data for storage in a shared pool of configurable resources. More specifically, the invention relates to evaluating data, quantifying the costs for storing the evaluated data, and selection of both a storage format and storage location based upon evaluation of the application data.

Cloud computing is a model of service delivery for enabling convenient, on-demand network access to a shared pool of configurable computer resources, e.g. networks, network bandwidth, servers, processing, memory, storage, applications, virtual machines, and services, that can be rapidly provisioned and released with minimal management effort or interaction with a provider of service. One of the characteristics of cloud computing infrastructure is that applications can be launched from a plurality of locations and generate data to be stored in one of a plurality of locations within the infrastructure. Several factors drive the decision to store application data in a specific data center within the infrastructure, including availability, user location, disaster awareness, and available facilities.

A storage system provides access to information that is stored on one or more storage devices connected to the storage system. Access to the information is possible by organizing the storage devices into volumes, which logically organize the information stored on the storage devices. The storage system may be further configured to operate according to a client/server model of information delivery to thereby allow many clients to access data containers stored on the system. Each client may request the services of the storage system by issuing file-based protocol messages to the system over the network. A plurality of storage systems may be interconnected to provide a storage system environment configured to service many clients. Each storage system may be configured to service one or more volumes, wherein each volume stores one or more data containers. The relationship between increase storage demand and commodity storage device capabilities is inversely proportional in that as the load of storage increases on the storage system, network bandwidth, storage capabilities and computer power decrease. Accordingly, there is a need to accommodate the burdens of storage devices while taking advantage of the storage space available in the shared pool of resources.

BRIEF SUMMARY

This invention comprises a method, system, and article for optimizing data stored in a shared pool of resources.

In one aspect of the invention, a method is provided for processing application data for storage. The aspect of processing the data employs a real-time analytical model for selecting a data format storage option and a storage location for the data. One of the goals of the data evaluation is to minimize an overall cost associated with storage of the data. There are different formats in which data can be stored, including compressed and non-compressed data. Selection of a data format storage option includes determining whether to compress said data. If it is determined that data compression will not take place prior to storage, the data is sent to a first selected location as raw data. However, if it is determined that data compression will take place prior to storage, a data compression technique that satisfies the analytical model evaluation is selected, and following compression, the compressed data is sent to a second selected storage location. The first and second selected storage locations are a part of a shared pool of resources, and may be different storage locations in the shared pool, or the same storage location in the shared pool.

In another aspect of the invention, a system is provided with a client machine in communication with application data. An evaluation manager is provided to process the application data, which includes use of a real-time analytical model for selection of a data format storage option and a storage location for the data. The processing performed by the evaluation manager minimizes an overall cost associated with storage of the data. A compression manager is provided in the system in communication with the evaluation manager. The compression manager makes a determination on whether to compress data. More specifically, if the compression manager determines that compression is unwarranted, the compression manager sends the data to a first selected location. At the same time, if the compression manager determines that compression is warranted, the compression manager determines an appropriate compression technique that satisfies the analytical model evaluation. Following compression, the compression manager sends the compressed data to a second selected storage location. The first and second selected storage locations are a part of a shared pool of resources, and may be different storage locations in the shared pool or the same storage location in the shared pool.

In yet another aspect of the invention, a computer program product is provided with a computer readable storage medium having embodied computer readable program code to process data. More specifically, computer readable program code employs a real-time analytical model for selection of a data format storage option and a storage location for the data. The goal of the data storage format and selection is to minimize an overall cost associated with storage of the data. Computer readable program code is also provided to determine whether to compress the data. If compression is unwarranted, the program code sends the data to a first selected storage location. Similarly, if compression is warranted, the program code both determines an appropriate compression technique that satisfies the analytical model and sends the compressed data to a second selected storage location. The first and second selected storage locations are a part of a shared pool of resources, and they may be different storage locations in the shared pool or the same storage location in the shared pool.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

Figure 1:
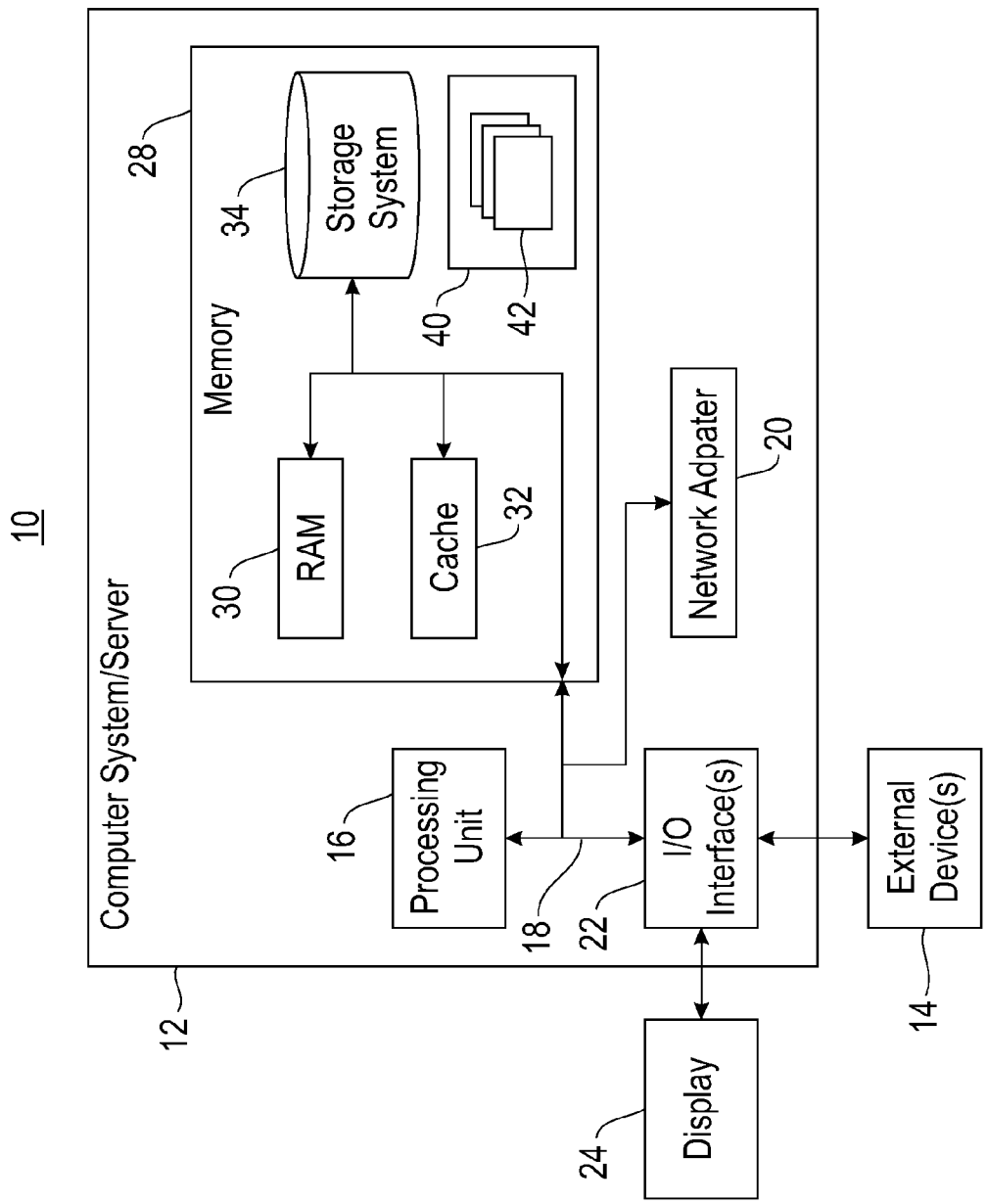
FIG. 1 depicts a cloud computing node according to an embodiment of the present invention.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as managers. A manager may be implemented in programmable hardware devices such as field programmable gate arrays, programmable array logic, programmable logic devices, or the like. The manager may also be implemented in software for processing by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the manager and achieve the stated purpose of the manager.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of managers, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

A cloud computing environment is service oriented with a focus on statelessness, low coupling, modularity, and semantic interoperability. At the heart of cloud computing is an infrastructure comprising a network of interconnected nodes. Referring now to FIG. 1, a schematic of an example of a cloud computing node is shown. Cloud computing node (10) is only one example of a suitable cloud computing node and is not intended to suggest any limitation as to the scope of use or functionality of embodiments of the invention described herein. Regardless, cloud computing node (10) is capable of being implemented and/or performing any of the functionality set forth hereinabove. In cloud computing node (10) there is a computer system/server (12), which is operational with numerous other general purpose or special purpose computing system environments or configurations. Examples of well-known computing systems, environments, and/or configurations that may be suitable for use with computer system/server (12) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (12) may be described in the general context of computer system-executable instructions, such as program modules, being executed by a computer system. Generally, program modules may include routines, programs, objects, components, logic, data structures, and so on that perform particular tasks or implement particular abstract data types. Computer system/server (12) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server (12) in cloud computing node (10) is shown in the form of a general-purpose computing device. The components of computer system/server (12) may include, but are not limited to, one or more processors or processing units (16), a system memory (28), and a bus (18) that couples various system components including system memory (28) to processor (16). Bus (18) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server (12) typically includes a variety of computer system readable media. Such media may be any available media that is accessible by computer system/server (12), and it includes both volatile and non-volatile media, removable and non-removable media.

System memory (28) can include computer system readable media in the form of volatile memory, such as random access memory (RAM) (30) and/or cache memory (32). Computer system/server (12) may further include other removable/non-removable, volatile/non-volatile computer system storage media. By way of example only, storage system (34) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (18) by one or more data media interfaces. As will be further depicted and described below, memory (28) may include at least one program product having a set (e.g., at least one) of program modules that are configured to carry out the functions of embodiments of the invention.

Program/utility (40), having a set (at least one) of program modules (42), may be stored in memory (28) by way of example, and not limitation, as well as an operating system, one or more application programs, other program modules, and program data. Each of the operating systems, one or more application programs, other program modules, and program data or some combination thereof, may include an implementation of a networking environment. Program modules (42) generally carry out the functions and/or methodologies of embodiments of the invention as described herein.

Computer system/server (12) may also communicate with one or more external devices (14), such as a keyboard, a pointing device, a display (24), etc.; one or more devices that enable a user to interact with computer system/server (12); and/or any devices (e.g., network card, modem, etc.) that enable computer system/server (12) to communicate with one or more other computing devices. Such communication can occur via Input/Output (I/O) interfaces (22). Still yet, computer system/server (12) can communicate with one or more networks such as a local area network (LAN), a general wide area network (WAN), and/or a public network (e.g., the Internet) via network adapter (20). As depicted, network adapter (20) communicates with the other components of computer system/server (12) via bus (18). It should be understood that although not shown, other hardware and/or software components could be used in conjunction with computer system/server (12). Examples, include, but are not limited to: microcode, device drivers, redundant processing units, external disk drive arrays, RAID systems, tape drives, and data archival storage systems, etc.

Figure 2:
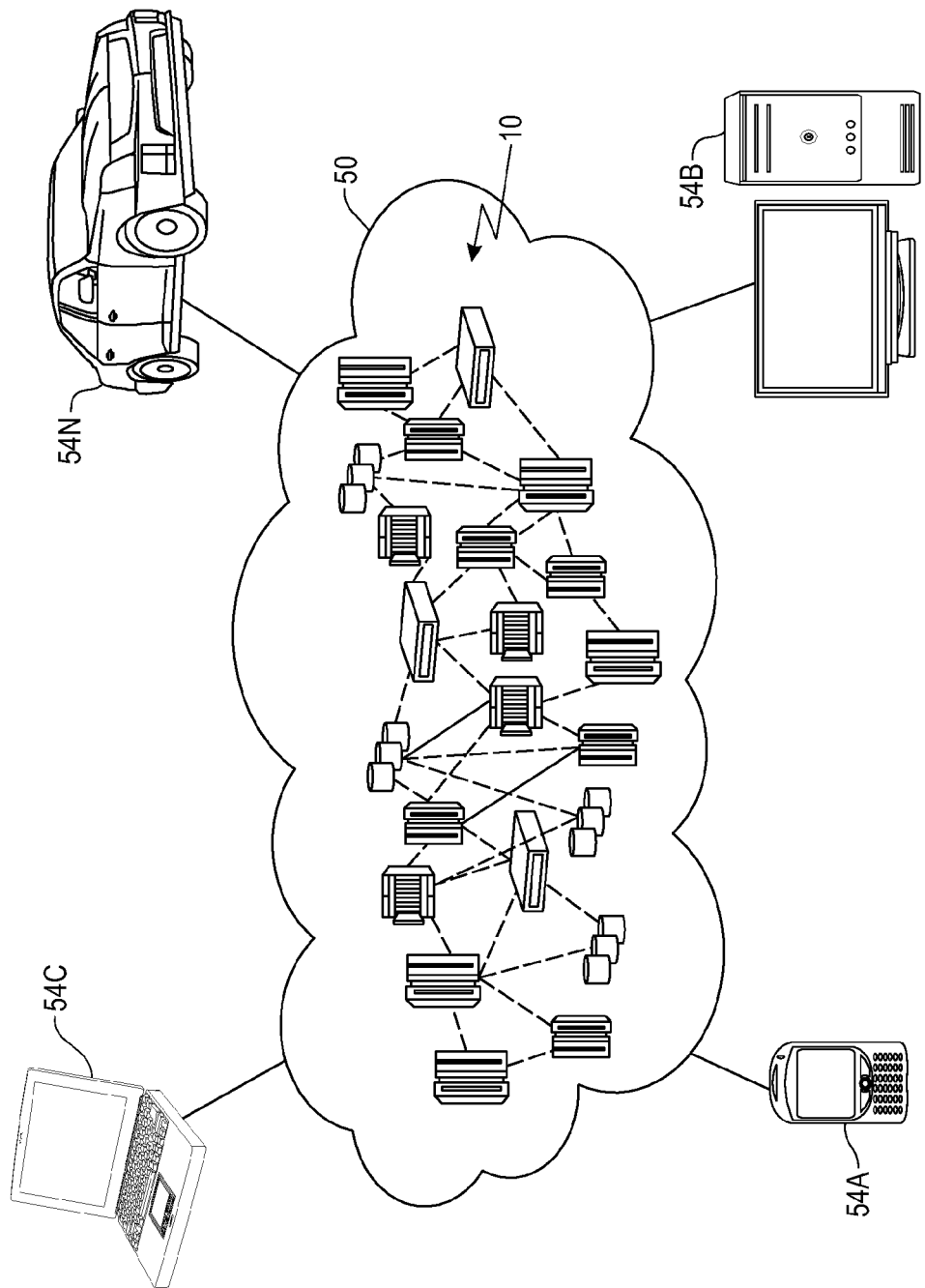
FIG. 2 depicts a cloud computing environment according to an embodiment of the present invention.

Referring now to FIG. 2, illustrative cloud computing environment (50) is depicted. As shown, cloud computing environment (50) comprises one or more cloud computing nodes (10) with which local computing devices used by cloud consumers, such as, for example, personal digital assistant (PDA) or cellular telephone (54A), desktop computer (54B), laptop computer (54C), and/or automobile computer system (54N) may communicate. Nodes (10) may communicate with one another. They may be grouped (not shown) physically or virtually, in one or more networks, such as Private, Community, Public, or Hybrid clouds as described hereinabove, or a combination thereof. This allows cloud computing environment (50) to offer infrastructure, platforms and/or software as services for which a cloud consumer does not need to maintain resources on a local computing device. It is understood that the types of computing devices (54A)-(54N) shown in FIG. 2 are intended to be illustrative only and that computing nodes (10) and cloud computing environment (50) can communicate with any type of computerized device over any type of network and/or network addressable connection (e.g., using a web browser).

Figure 3:
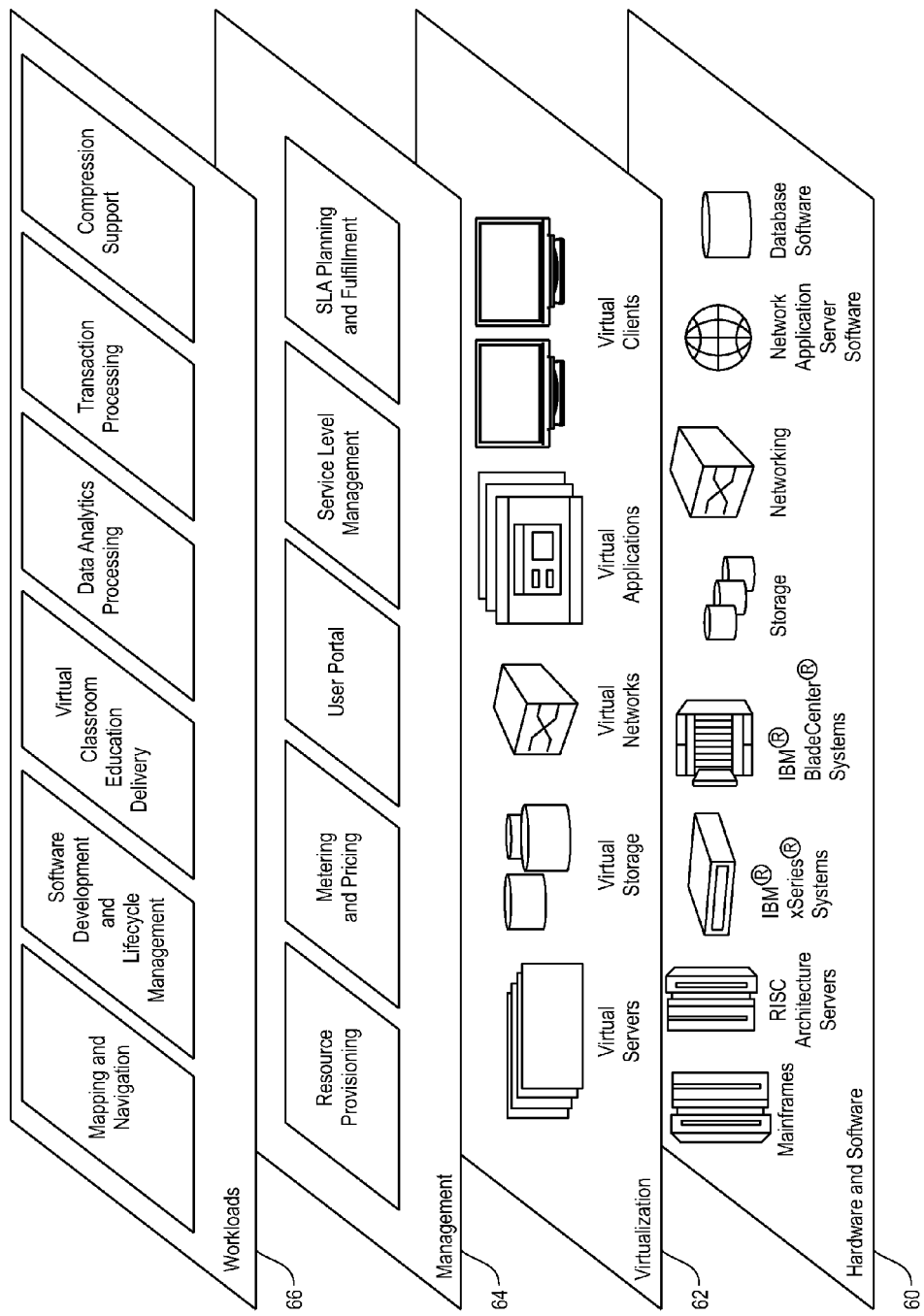
FIG. 3 depicts abstraction model layers according to an embodiment of the present invention.

Referring now to FIG. 3, a set of functional abstraction layers provided by cloud computing environment (50) (FIG. 2) is shown. It should be understood in advance that the components, layers, and functions shown in FIG. 3 are intended to be illustrative only and embodiments of the invention are not limited thereto. As depicted, the following layers and corresponding functions are provided: hardware and software layer (60), virtualization layer (62), management layer (64), and workload layer (66). The hardware and software layer (60) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (62) provides an abstraction layer from which the following examples of virtual entities may be provided: virtual servers; virtual storage; virtual networks, including virtual private networks; virtual applications and operating systems; and virtual clients.

In one example, management layer (64) may provide the following functions: resource provisioning, metering and pricing, user portal, service level management, and SLA planning and fulfillment. The functions are described below. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (66) provides examples of functionality for which the cloud computing environment may be utilized.

Examples of workloads and functions which may be provided from this layer includes, but is not limited to: mapping and navigation; software development and lifecycle management; virtual classroom education delivery; data analytics processing; transaction processing; and maintenance of a data structure to support efficient and effective data compression and storage within the cloud computing environment.

As the demand for data storage in a shared pool of configurable resources increases, there is a need to devise a shared pool that adapts to demand while minimizing storage costs as well as client costs. Smart data compression identifies compression opportunities that minimize storage footprint and network bandwidth, at the cost of compute cycles. Data compression may take place at different locations based upon the identified compression opportunities. For example, compression may take place local to the client with compressed data sent to the shared pool for storage. Similarly, compression may take place local to the shared pool, with non-compressed data sent over the network. Or, a partial compression may take place local to the client with the remainder of the compression to take place local to the shared pool. Accordingly, different compression and storage opportunities are available based upon identified needs of the subject data.

Figure 4:
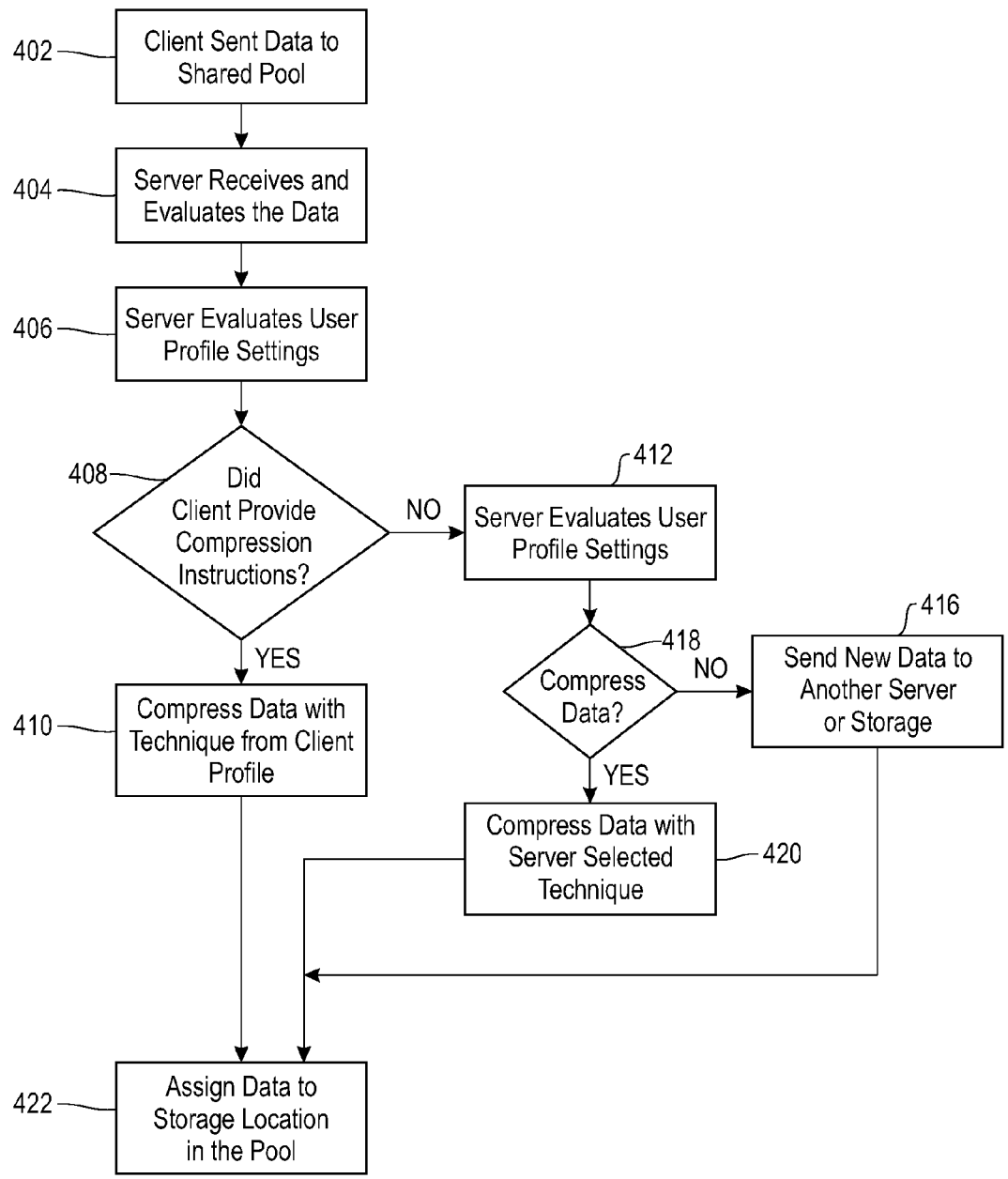
FIG. 4 is a flow chart illustrating a process in which the evaluation and compression of the data takes place in the shared pool.

FIG. 4 is a flow chart (400) illustrating a process in which the evaluation and compression of the data takes placed in the shared pool. A client sends data for storage to the shared pool (402). In one embodiment, the shared pool is configured with a server in communication with at least two storage devices. In one embodiment, a heterogeneous set of clients may be in communication with the server. The data sent at step (402) has not been compressed, and is otherwise known as raw data. The server receives the data (404) and evaluates the data with respect to an appropriate format and storage location for the received data. In one embodiment, the server employs a proxy to address compression of the data received from the client, wherein the proxy serves as an interface to the storage devices. Accordingly, raw data, i.e. non-compressed data, is sent from the client to the shared pool of resources.

Following receipt of the data, the server evaluates one or more initial settings on a user profile associated with the client (406) to transparently determine an appropriate storage format and location for the data. More specifically, the user profile may include settings and specifications for the data that provides guidance to the server for storage format and location. For example, the user profile may provide an indication of frequency of data access, a suggested compression technique, etc. Accordingly, the communication between the client and the shared pool is transparently managed by a server and/or server proxy.

Upon evaluation of the user profile, the server determines if the client has provided instructions for a requested compression technique (408). A positive response to the determination at step (408) is followed by the server compressing the data with the technique suggested in the client profile (410). Conversely, a negative response to the determination at step (408) is followed by the server evaluating the received data (412) to determine whether to compress the data (418), and if the determination is to compress the data an appropriate compression technique and location (412). More specifically, following steps (410) or (420) when it is determined that the data should be compressed, either the server in receipt of the raw data compresses the data with the determined compression technique. However, if a compression technique is not selected by the client or the server, the raw data is sent to another server in the pool of shared resources for compression and/or storage (416). Accordingly, as demonstrated, the data received by the server may be compressed by a client directed technique, a server directed technique, or it may remain in raw format.

If at step (418) it is determined that the data should not be compressed, the data remains in a raw data format for storage. Following compression of the data at steps (410) or (420) or the data remaining in raw format at step (416), the server with the subject data then assigns and sends the data to an appropriate data storage location in the shared pool (422). More specifically, at step (422) the server assigns an appropriate location for the data based upon several factors, including but not limited to, frequency of access of the data. Accordingly, optimization of the data shown herein is processed automatically and transparently on the server side with client instructions limited to a client side profile.

Figure 5:
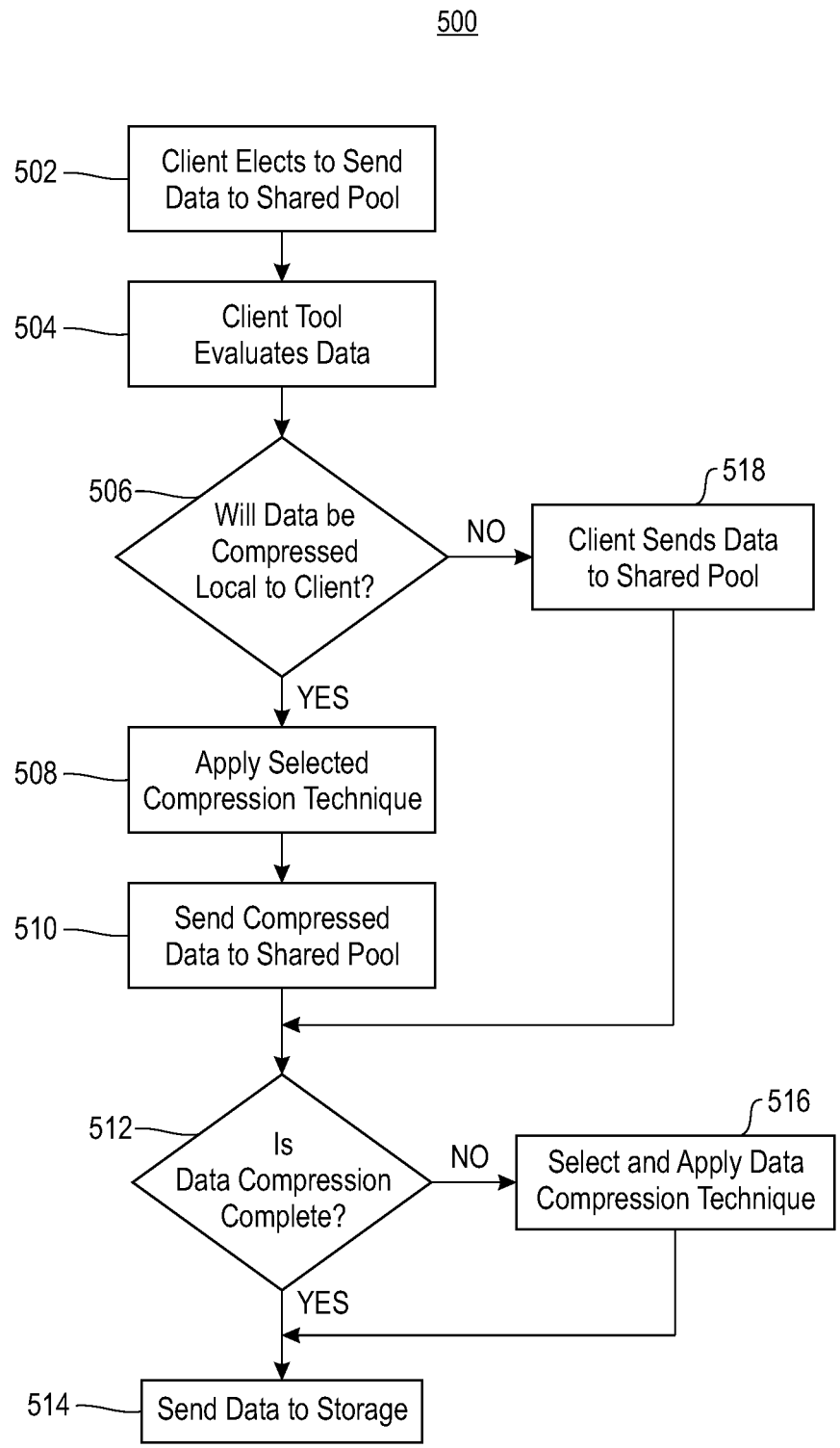
FIG. 5 is a flow chart illustrating a process for limited client side processing of data for evaluation and compression.

As shown in FIG. 4, in the process of selecting a compression technique and in limited circumstances compressing the data, a simple client side interface is employed to communicate with a server in the shared pool of resources. In one embodiment, the client may be provided with a tool for limited processing of the data before communicating with the server. FIG. 5 is a flow chart (500) illustrating a process for limited client side processing of data for evaluation and storage. The client elects to send data for storage to the shared pool (502), which is configured with a server in communication with at least two data storage devices. Prior to sending the data, a tool local to the client evaluates the data for compression needs and techniques available (504). More specifically, at step (504), the tool will perform the evaluation based on several factors, including but not limited to, data type, frequency of access, etc. Following step (504), it is determined if the data is to be compressed locally (506). The determination at step (506) is an indication that a compression technique is selected based upon both the ability to compress the data locally and the feasibility of such compression.

If the response to the determination at step (506) is positive, a selected compression technique is applied locally to the data (508). More specifically, the compression of the data is processed local to the client machine. Following completion of the data compression, the client machine sends the compressed data for storage in the shared pool (510). By the client machine compressing the data, I/O cost to the shared pool is reduced in comparison to transmission of raw (non-compressed) data. Following receipt of the data at step (510), a server (or shared pool interface) determines if the data compression applied by the client is completed (512). In one embodiment, the client may have limited computer power to process a complete compression of the subject data. A positive response to the determination at step (512) is an indication that the data compression is completed and followed by the server (or shared pool interface) sending the data to a data storage location in the shared pool (514). In one embodiment, the client may select the storage location within the shared pool. If no instructions are present, then the server selects the storage location within the pool. Accordingly, as shown herein data compression may take place local to the client thereby reducing the footprint of data communicated over the network from the client to the shared pool.

In limited circumstances the client may either not elect to compress the data, or the client may not have the computer power to complete the data compression. If at step (512) it is determined that the compression is not completed, the server (or shared pool interface) may complete the data compression (516) followed by a return to step (514). Although the I/O costs across the network is not as efficient as with client side compression, the further processing by the server further reduces the footprint of the data, thereby reducing storage cost. However, if at step (506) it is determined that the compression of the data will not take place local to the client machine, the client sends the data to the shared pool (518) and then proceeds to step (510) for compression evaluation within the shared pool. In one embodiment, following steps (506) or (508), the server (or shared pool interface) determines an appropriate data storage location within the shared pool, or the client specifies an appropriate storage location within the shared pool. Regardless of whether the client, server, or shared pool interface determines an appropriate storage location, compression of the data local to the client may take place in an effort to reduce I/O costs to the shared pool.

As described in FIGS. 4 and 5, compression of the data may take place local to the client and transmitted to the shared pool in a compressed format, or the compression may take place within the shared pool with the client transmitting raw data to the shared pool. In one embodiment, a hybrid of the two processes may be employed, wherein a limited compression of the data takes place local to the client. Transmission of the data to the shared pool includes all of the data, with part of the data being raw and part of the data being compressed. Compression of data local to the client is described in FIG. 4. Following receipt of the data in the pool, the server or shared pool interface would then assess further compression, storage location, etc. as described in detail in FIG. 5. Accordingly, a hybrid of the processes described in FIGS. 4 and 5 may be employed in a manner to relieve some of the burden from the client of data compression as well as bandwidth concerns for transmission of raw data.

Figure 6:
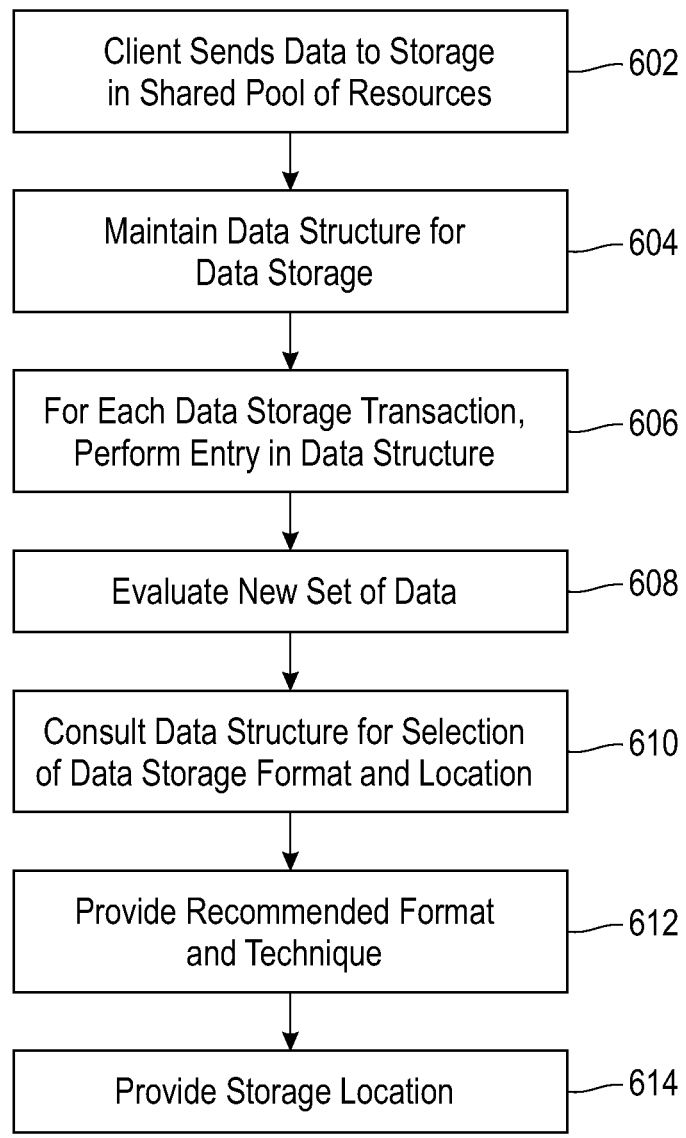
FIG. 6 is a flow chart illustrating a process for processing data for compression and storage by leveraging data associated with prior data storage and compression techniques.

In order to optimize how data is stored in the shared pool, the overall system costs may be estimated based upon prior data storage requests. FIG. 6 is a flow chart (600) illustrating a process for processing data for compression and storage by leveraging data associated with prior data storage and compression. As illustrated in FIGS. 4 and 5, data is sent from a client machine to a data storage location within a shared pool of resources via a server (602). The data may be compressed, raw, or partially compressed when communicated from the client to the server (or shared pool interface), and ultimately to the data storage location. A data structure pertaining to the data storage is maintained (604). More specifically, for each data storage transaction, an entry in the data structure is performed (606). The data structure may include a profile for each entry that identifies the compression algorithm, the size of the storage footprint, a location where the compression took place, and a storage location for the data.

For a new data storage transaction, the data structure may be consulted and employed as a tool to determine an appropriate data compression technique, storage location, etc. as a part of evaluation of the data. One focus of the evaluation is to reduce costs associated with data storage. Accordingly, by quantifying a cost component of one or more stored profiles, the evaluation of data may be based upon historical knowledge.

When a new set of data is evaluated for processing (608), the data structure is consulted as part of the real-time analytical model for selection of a data storage format and location (610). More specifically, the data maintained in the data structure profiles prior data storage and data transfer techniques. From this data, cost components of storing and retrieving data from storage may be quantified and leveraged to minimize the cost for storage of future data transactions. The following is a formula employed for calculating the minimum cost for data compression and storage based upon data obtained from the data structure:

$$\text{cost}_t = \text{Min}\left(\sum_{u=1}^{n}\sum_{m=1}^{u} \text{cost}_u(u, D_u, T, A_u, P_m)\right)$$

where the $\text{cost}_t$ is the overall system cost taken over all users. The cost is minimized by calculating an optimal storage scheme for each individual client, u, the data type, $D_u$, time, T, access pattern for the client, $A_u$, and a client specified profile, $P_m$. In one embodiment, the client specified profile is used to specify the domain of possible compression and location alternatives, as well as other criteria to guide the optimization process. The cost for the individual client, $\text{cost}_u$, is the minimum cost per client$_u$ given three possible forms of data optimization, including option$_a$, option$_b$, and option$_c$, although the invention should not be limited to an embodiment of three optimization options. In one embodiment, the quantity of optimization options may be greater or less than the quantity illustrated herein. Each of the three options employs three factors, including compression, transfer and storage. The compression factor corresponds to local compression. The transfer factor, Transfer, corresponds to costs due to the transfer of data from the client to the shared pool. The store factor corresponds to storing data, and includes costs of data transfer between shared pools.

As shown, each of the options, option$_a$, option$_b$, and option$_c$ are based upon different factors. The options are represented as follows:

Option$_a$=compress$_l$($D_u,P_m$)+Transfer($D'_u$)+store($D'_u$)

Option$_b$=compress$_l$(i $D_u$)+Transfer($D'_u$)+compress$_r$($D'_u,P_m$)+store($D''_u,P_m$)

Option$_c$=compress$_r$($D_u,P_m$)+Transfer($D_u$)+store($D'_u$)

The cost, $\text{cost}_a$, is the minimum of Option$_a$, Option$_b$, and Option$_c$, as defined above. The transfer, compress, and store values are obtained from the data structure, as they are based upon historical data of prior data compressed and/or stored. More specifically, the compress$_l$ value corresponds to local compression, the compress$_r$ value corresponds to remote compressions, transfer corresponds to cost due to transfer of data between the client and the shared pool, and store corresponds to storing data in a storage device and takes into account cost of data transfer within the shared pool. In one embodiment, a cost of de-compression is maintained in the data structure for data that is fetched from the shared pool and returned to a requesting client. There is a cost savings for reducing the size of the footprint. However, for data that is read repeatedly, the cost of decompressing the data may offset the cost savings due to the reduced footprint. Accordingly, based upon the data maintained in the data structure and the associated calculations, cost is estimated based upon data type and access pattern in order to optimally store data while mitigating storage costs.

Based upon the costs analysis from data maintained in the data structure, a recommended compression technique (612) and storage location (614) are provided. More specifically, as demonstrated above, the data from the data structure is employed to determine a minimal cost estimate associated with storage of the data. The minimal costs estimate includes compression techniques, estimated footprint for storage, costs for decompression responsive to a read request, etc. In some circumstances a high compression ratio may reduce the footprint of the data, but if the data is considered to be frequently read, there may be a cost burden of decompression. Accordingly, the cost estimate accounts for historical data compression and usage in an effort to predict an optimal data compression technique and storage location.

Figure 7:
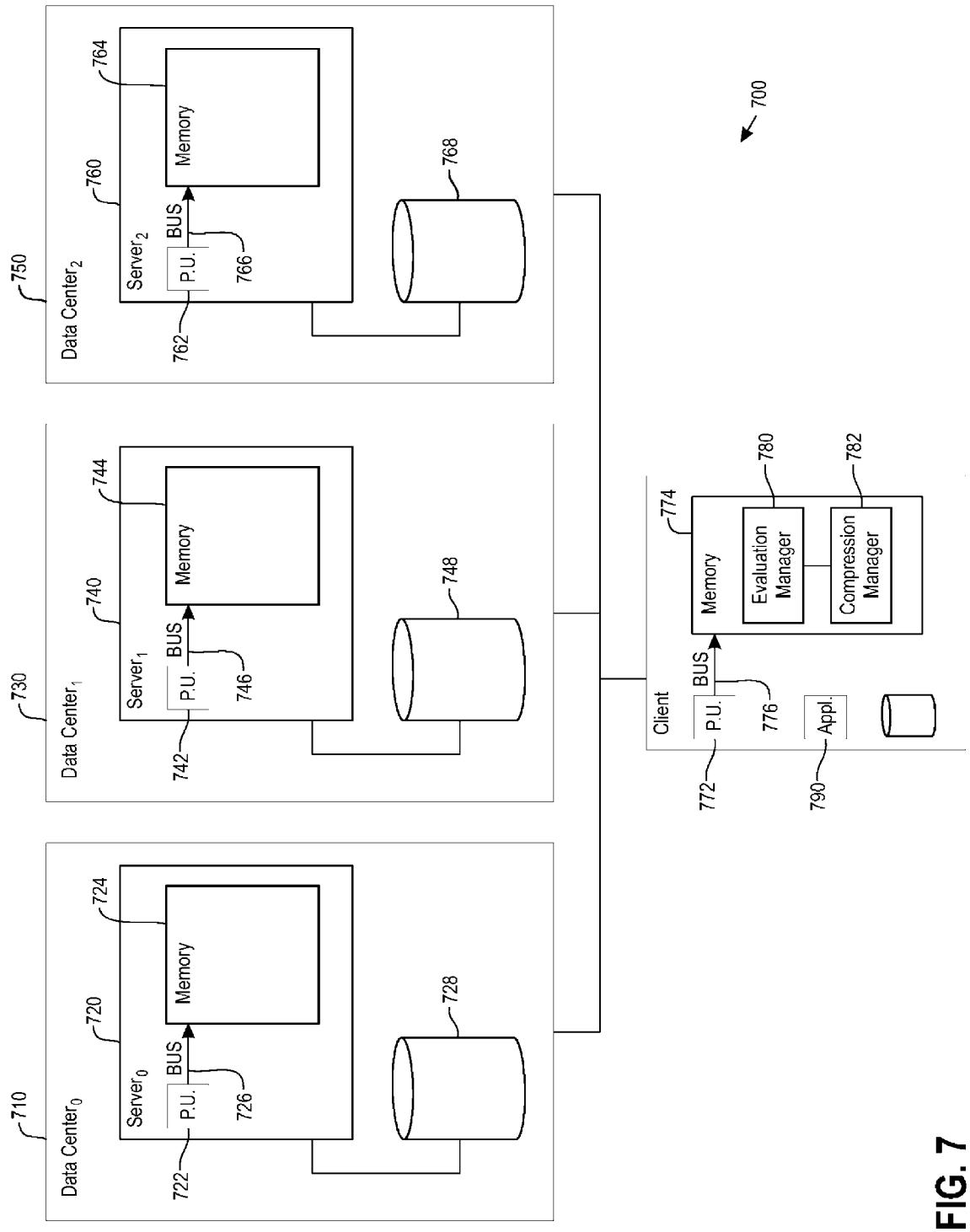
FIG. 7 is a block diagram illustrating embedded client side tools to support processing of application data for storage, and is suggested for printing on the first page of the issued patent.

As demonstrated in the flow charts of FIGS. 4-6, a method is employed to support a real-time, i.e. dynamic, model for selecting both a data compression format and a storage location for the data to minimize costs for data storage. FIG. 7 is a block diagram (700) illustrating embedded client side tools to support processing of application data for storage. In one embodiment, the tools are employed in a shared pool of resources, such as a cloud computing environment. More specifically, a shared pool of configurable computer resources is shown with a first data center (710), a second data center (730), and a third data center (750). Although three data centers are shown in the example herein, the invention should not be limited to this quantity of data centers in the computer system. Accordingly, three or more data centers may be employed to support dynamic processing of application data for storage.

Each of the data centers in the system is provided with at least one server in communication with data storage. More specifically, the first data center (710) is provided with a server (720) having a processing unit (722), in communication with memory (724) across a bus (726), and in communication with first local storage (728); the second data center (730) is provided with a server (740) having a processing unit (742), in communication with memory (744) across a bus (746), and in communication with second local storage (748); and the third data center (750) is provided with a server (760) having a processing unit (762), in communication with memory (764) across a bus (766), and in communication with third local storage (768). Both server (720) and server (740) may separately communicate with the third local storage (768) across a network connection (705).

As described above, there are different embodiments to support dynamic processing of application data. In one embodiment, a client machine (770) is provided in communication with at least one of the data centers. More specifically, the client machine (770) is provided with a processing unit (772), in communication with memory (774) across a bus (776). An application (790) processes read and write transactions local to the client machine (770). Following a write transaction by the application, data is stored locally and/or remotely. In one embodiment, an evaluation manager (780) is provided local to the client machine (770) to process application data. More specifically, the evaluation manager (780) employs a real-time analytical model for selection of both a data format option and a storage location for the data. The goal of the evaluation manager is to minimize overall costs associated with storage of the data.

A compression manager (782) is provided in communication with the evaluation manager (780). The compression manager (782) determines whether or not the data should be compressed, as well as an appropriate storage location for the data. If the compression manager (782) determines that the data should not be compressed, the compression manager (782) selects an appropriate data storage location and sends the data to the location. On the other hand, if the compression manager (782) determines that the data should be compressed, the compression manager determines an appropriate compression technique that satisfies the analytical model employed by the evaluation manager (780), compresses the data, and then sends the data to a select storage location. As shown herein, there is a plurality of data storage locations. In one embodiment, the data storage locations are located within the shared pool of resources as exemplified by the first, second, and third data centers (710), (730), and (750), respectively, and their respective data storage. Accordingly, the evaluation and compression managers (780) and (782), respectively, may be local to the client (770), with the data processing and/or compression taking place local to the client (770).

The uncompressed data and the compressed data may be stored in different storage locations or the same data location within the shared pool. More specifically, as shown, each of the first, second, and third data centers each have data storage, and the uncompressed and compressed data may be stored in the data storage of the same data center or different data centers. Accordingly, as shown and described above, the data compression may take place local to the client machine (770).

Figure 8:
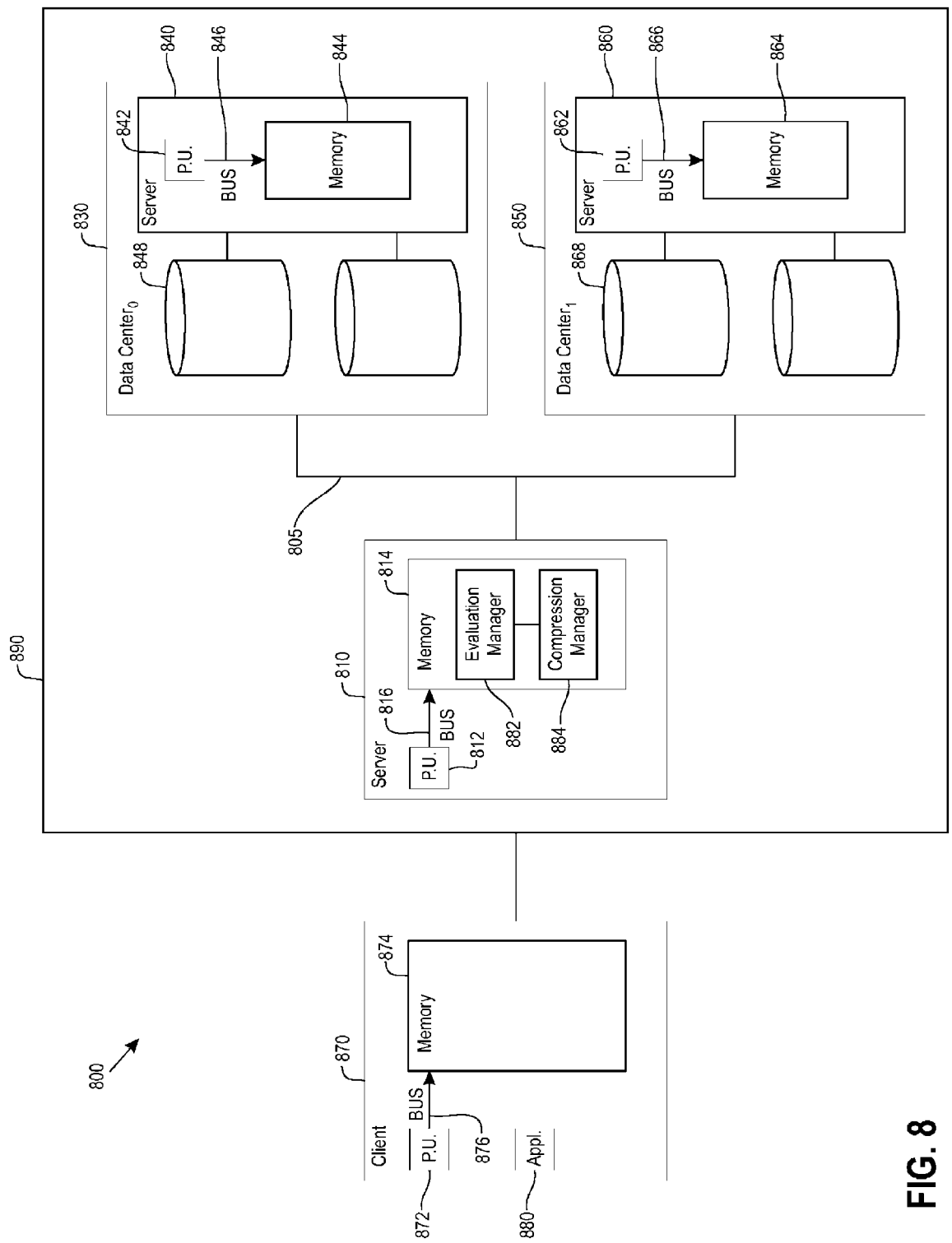
FIG. 8 is a block diagram illustrating tools embedded in a shared pool of resources within a computer system to support processing of application data for storage.

However, there are other configurations of the system available. More specifically, the client (770) may not be provided with the infrastructure to perform data compression, or in one embodiment a complete data compression. FIG. 8 is a block diagram (800) illustrating tools embedded in a shared pool of resources within a computer system to support processing of application data for storage. In one embodiment, the tools are employed in a shared pool of resources (890), such as a cloud computing environment. More specifically, a shared pool of configurable computer resources is shown with a server (810) in communication with a first data center (830) and a second data center (850). Although two data centers are shown in the example herein, the invention should not be limited to this quantity of data centers in the computer system. Accordingly, two or more data centers may be employed to support dynamic processing of application data for storage.

Server (810) is provided with a processing unit (812) in communication with memory (814) across a bus (816). Each of the data centers in the system is provided with at least one server in communication with data storage. More specifically, the first data center (830) is provided with a server (840) having a processing unit (842), in communication with memory (844) across a bus (846), and in communication with second local storage (848), and the second data center (850) is provided with a server (860) having a processing unit (862), in communication with memory (864) across a bus (866), and in communication with third local storage (868). Both server (820) and server (840) may separately communicate with the server (810) across a network connection (805).

As described above, there are different embodiments to support dynamic processing of application data. A client machine (870) is provided in communication with shared pool (890). The client machine (870) is provided with a processing unit (872), in communication with memory (874) across a bus (876). An application (880) processes read and write transactions local to the client machine (870). Following a write transaction by the application, data is stored locally and/or remotely. In one embodiment, the client (870) is in communication with the shared pool (890), and specifically with the server (810) in the shared pool, with the server (810) directing data evaluation, compression, and storage. More specifically, the evaluation manager (882) and compression manager (884), with the functionality described in FIG. 7, may be provided local to the server (810), including the evaluation manager (882) employing a real-time analytical model for selection of both a data format option and a storage location for the data. By configuring the system with the evaluation and compression managers (882) and (884), respectively, within the shared pool (890), processing burdens associated with compression of data is removed from the client (870).

Figure 9:
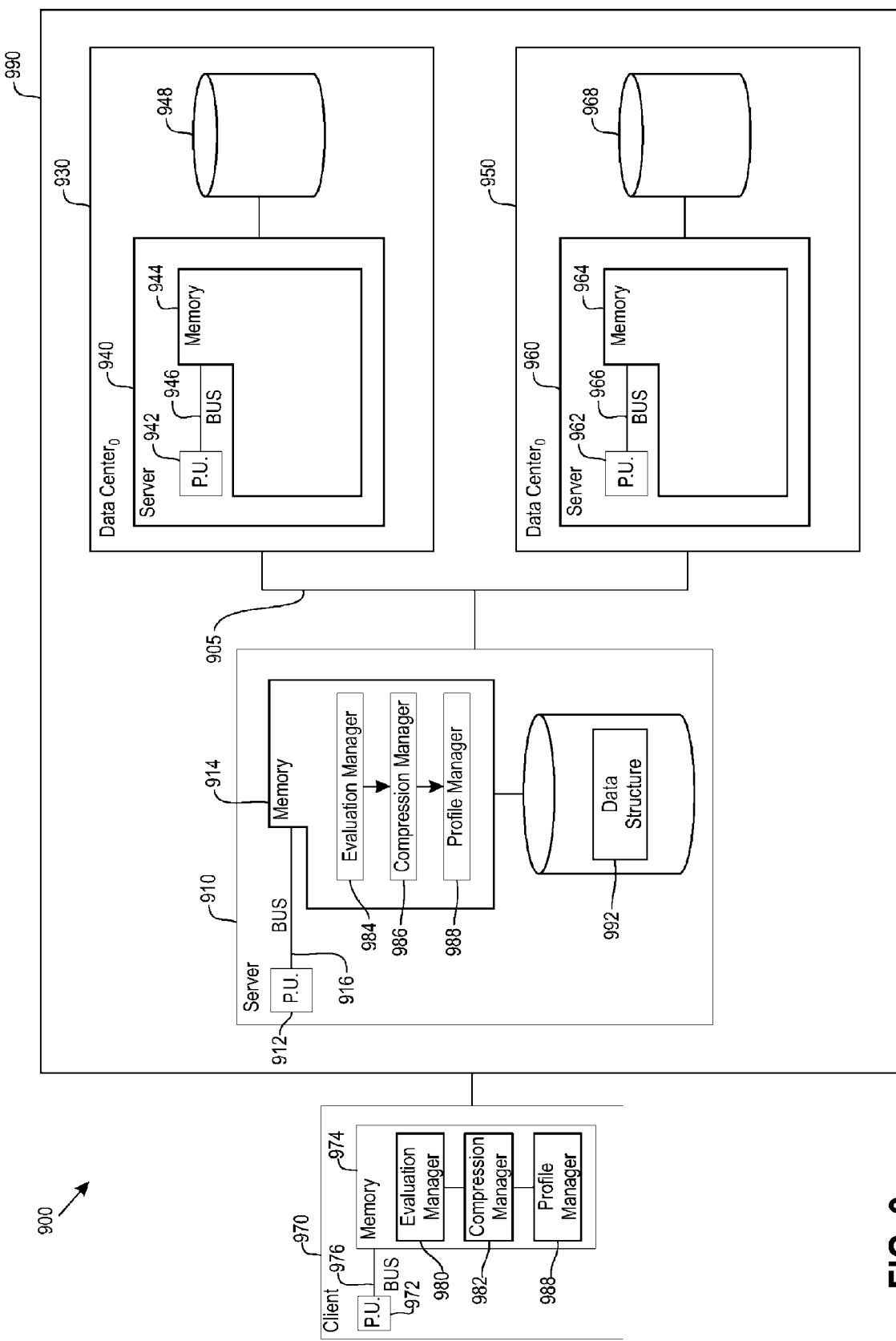
FIG. 9 is a block diagram illustrating tools embedded in both a shared pool of resources and a client in communication with the shared pool to support processing of application data for storage.

In one embodiment, the client and a server within the shared pool may share the burden and responsibility of data compression. More specifically, the client may not be provided with the infrastructure to perform some of the data compression, with a remaining portion of the data compression to take place in a server within the shared pool. FIG. 9 is a block diagram (900) illustrating tools embedded in both a shared pool of resources and a client in communication with the shared pool to support processing of application data for storage. In one embodiment, the tools are employed in a shared pool of resources (990), such as a cloud computing environment. More specifically, a shared pool of configurable computer resources is shown with a server (910) in communication with a first data center (930) and a second data center (950). Although two data centers are shown in the example herein, the invention should not be limited to his quantity of data centers in the computer system. Accordingly, two or more data centers may be employed to support dynamic processing of application data for storage.

Server (910) is provided with a processing unit (912) in communication with memory (914) across a bus (916). Each of the data centers in the system is provided with at least one server in communication with data storage. More specifically, the first data center (930) is provided with a server (940) having a processing unit (942), in communication with memory (944) across a bus (946), and in communication with second local storage (948), and the second data center (950) is provided with a server (960) having a processing unit (962), in communication with memory (964) across a bus (966), and in communication with third local storage (968). Both server (940) and server (960) may separately communicate with the server (910) across a network connection (905).

As described above, there are different embodiments to support dynamic processing of application data. A client machine (970) is provided in communication with shared pool (990). The client machine (970) is provided with a processing unit (972), in communication with memory (974) across a bus (976). Evaluation and compression managers (980) and (982), respectively, and as described above in FIG. 7, may be local to the client (970), to manage data processing and/or compression taking place local to the client (970). The client (970) is in communication with the shared pool (990), and specifically with the server (910) in the shared pool, with the server (910) directing data evaluation, compression, and storage. More specifically, an evaluation manager (984) and compression manager (986) may be provided local to the server (910) and function in conjunction with the managers (980) and (982), local to the client (970) to complete data evaluation and compression not completed by the client (970). Accordingly, by configuring the system with the client evaluation and compression managers (980) and (982), respectively, and the server evaluation and compression managers (984) and (986), respectively, processing burdens associated with compression of data is shared by the client (970) and the server (910).

In addition to the managers described above, a profile manager (988) may be provided in communication with the evaluation and compression managers (980) and (982), respectively, and (984) and (986), respectively. The profile manager (988) profiles each prior data format selection and the storage location of the data within the shared pool (990). More specifically, the profile manager (988) quantifies a cost component to the profiled data and stores the profile in a data structure (992). In one embodiment, the data structure (992) is stored within the shared pool (990) and local to the server (910), although the invention should not be limited to this location for storage of the data structure. By maintaining the profile date, the evaluation manager(s) (980) and (984) may utilize the quantified cost component for the stored profile(s) as a factor in evaluation of the processed data, and for selection of a storage format and location. The quantified cost component may include the following: a compression ratio of the data, storage location of the data, and retrieval costs of stored data. It should be noted that in assessing costs for storage or retrieval of data, the overall costs includes cost of transferring the data between the client (970) and the shared pool (990), as well as a cost of compressing and decompressing the data. Accordingly, the overall costs should be assessed for determination of compression and storage of the data in response to a write transaction, as well as de-compression of the data in response to a read transaction.

As identified above, the evaluation, compression and profile managers are shown residing in memory of the machine in which they reside. As described above, in different embodiment the managers may reside on different machines in the system. In one embodiment, the evaluation, compression and profile managers may reside as hardware tools external to memory of the machine in which they reside, or they may be implemented as a combination of hardware and software. Similarly, in one embodiment, the managers may be combined into a single functional item that incorporates the functionality of the separate items. As shown herein, each of the manager(s) are shown local to one machine. However, in one embodiment they may be collectively or individually distributed across the shared pool of configurable computer resources and function as a unit to manage dynamic data evaluation and storage. Accordingly, the managers may be implemented as software tools, hardware tools, or a combination of software and hardware tools.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
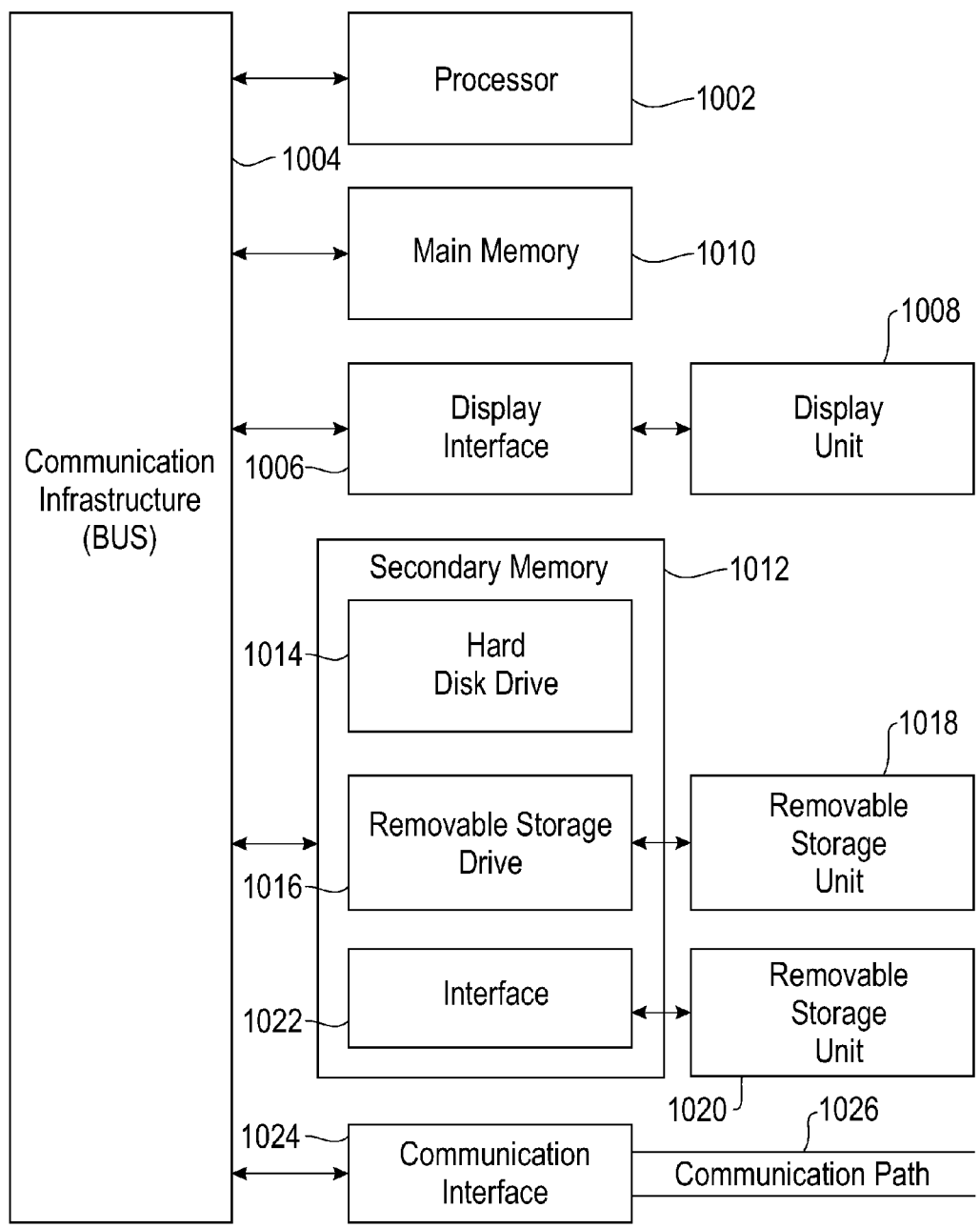
FIG. 10 is a block diagram showing a system for implementing an embodiment of the present invention.

Referring now to FIG. 10 is a block diagram (1000) showing a system for implementing an embodiment of the present invention. The computer system includes one or more processors, such as a processor (1002). The processor (1002) is connected to a communication infrastructure (1004) (e.g., a communications bus, cross-over bar, or network). The computer system can include a display interface (1006) that forwards graphics, text, and other data from the communication infrastructure (1004) (or from a frame buffer not shown) for display on a display unit (1008). The computer system also includes a main memory (1010), preferably random access memory (RAM), and may also include a secondary memory (1012). The secondary memory (1012) may include, for example, a hard disk drive (1014) and/or a removable storage drive (1016), representing, for example, a floppy disk drive, a magnetic tape drive, or an optical disk drive. The removable storage drive (1016) reads from and/or writes to a removable storage unit (1018) in a manner well known to those having ordinary skill in the art. Removable storage unit (1018) represents, for example, a floppy disk, a compact disc, a magnetic tape, or an optical disk, etc., which is read by and written to by removable storage drive (1016). As will be appreciated, the removable storage unit (1018) includes a computer readable medium having stored therein computer software and/or data.

In alternative embodiments, the secondary memory (1012) may include other similar means for allowing computer programs or other instructions to be loaded into the computer system. Such means may include, for example, a removable storage unit (1020) and an interface (1022). Examples of such means may include a program package and package interface (such as that found in video game devices), a removable memory chip (such as an EPROM, or PROM) and associated socket, and other removable storage units (1020) and interfaces (1022) which allow software and data to be transferred from the removable storage unit (1020) to the computer system.

The computer system may also include a communications interface (1024). Communications interface (1024) allows software and data to be transferred between the computer system and external devices. Examples of communications interface (1024) may include a modem, a network interface (such as an Ethernet card), a communications port, or a PCM-CIA slot and card, etc. Software and data transferred via communications interface (1024) are in the form of signals which may be, for example, electronic, electromagnetic, optical, or other signals capable of being received by communications interface (1024). These signals are provided to communications interface (1024) via a communications path (i.e., channel) (1026). This communications path (1026) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (1010) and secondary memory (1012), removable storage drive (1016), and a hard disk installed in hard disk drive (1014).

Computer programs (also called computer control logic) are stored in main memory (1010) and/or secondary memory (1012). Computer programs may also be received via a communication interface (1024). Such computer programs, when run, enable the computer system to perform the features of the present invention as discussed herein. In particular, the computer programs, when run, enable the processor (1002) to perform the features of the computer system. Accordingly, such computer programs represent controllers of the computer system.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Alternative Embodiment

It will be appreciated that, although specific embodiments of the invention have been described herein for purposes of illustration, various modifications may be made without departing from the spirit and scope of the invention. In particular, the system can be configured with an interface in the shared pool of resources. The interface receives data from the client, assesses the data for compression, and/or directs the data to storage within the shared pool of resources. Accordingly, the scope of protection of this invention is limited only by the following claims and their equivalents.

We claim:

1. A method comprising:
   processing application data for storage;
   evaluating the processed data including using a real-time analytical model for recommending a compression technique together with a storage location, the evaluation including minimizing a cost for storage of the data the cost incorporating options of local compression, data transfer, and data storage;
   the recommending includes determining whether to compress the data, and when compression is unwarranted sending the data to a first selected location, when compression is warranted determining an appropriate compression technique that satisfies the analytical model evaluation, compressing the data based upon the appropriate compression technique, and sending the compressed data to a second selected storage location, wherein the first and second selected storage locations are a part of a shared pool of resources and selected from the group consisting of: different storage locations in the shared pool, and the same storage location in the shared pool.

2. The method of claim 1, wherein evaluation of the data includes an application selecting and applying a compression technique to the data, the application is in a location with respect to a shared pool of resources selected from the group consisting of: local, remote, and a combination thereof.

3. The method of claim 2, further comprising the local application and the remote application cooperatively achieving compression of the evaluated data.

4. The method of claim 1, further comprising profiling each prior data format selection and data storage location, and quantifying a cost component to the profile data and storing the profile in a data structure.

5. The method of claim 4, wherein the quantified cost component includes a compression ratio of the data, storage location of data, and retrieval costs of the stored data.

6. The method of claim 1, the overall cost associated with storage of the data, includes a cost of transferring the data between a client machine and the shared pool of configurable computer resources and compressing and decompressing the data.

7. A system comprising:
   a client machine with a processing unit and in communication with application data;
   an evaluation manager in communication with the processing unit, the evaluation manager to process the application data, including use of a real-time analytical model for recommendation of a compression technique together with a storage location, the evaluation manager to minimize a cost for storage of the data, the cost incorporating options of local compression, data transfer, and data storage;
   a compression manager in communication with the evaluation manager, the compression manager to determine whether to compress the data, and when compression is unwarranted to send the data to a first selected location, when compression is warranted to determine an appropriate compression technique that satisfies the analytical model evaluation, compress the data with the appropriate compression technique, and to send the compressed data to a second selected storage location, wherein the first and second selected storage locations are a part of a shared pool of resources and selected from the group consisting of: different storage locations in the shared pool, and the same storage location in the shared pool.

8. The system of claim 7, further comprising the compression manager to select and apply a compression technique to the data, and wherein the compression manager is in a location with respect to a shared pool of resources selected from the group consisting of: local, remote, and a combination thereof.

9. The system of claim 8, further comprising a first application local to the client machine and a second application remote from the client machine to cooperatively compress the evaluated data.

10. The system of claim 7, further comprising a profile manager in communication with the evaluation manager, the profile manager to profile each prior data format selection and data storage location, and to quantify a cost component to the profiled data and to store the profile in a data structure.

11. The system of claim 10, further comprising the evaluation manager to employ the quantified cost component of one or more stored profiles as a factor in evaluation of the processed data and selection of a storage format and location.

12. The system of claim 10, wherein the quantified cost component includes a compression ratio of the data, storage location of data, and retrieval costs of the stored data.

13. The system of claim 7, wherein the overall cost associated with storage of the data, includes a cost of transferring the data between the client machine and a shared pool of configurable computer resources and a cost of compressing and decompressing the data.

14. A computer program product, the computer program product comprising a non-transitory computer readable storage device having computer readable program code embodied therewith, the computer readable program code comprising:

computer readable program code configured to process data, including use of a real-time analytical model for recommending a compression technique together with a storage location, the recommendation based on minimization of cost for storage of the data, the cost incorporating options of local compression, data transfer, and data storage;

computer readable program code configured to determine whether to compress the data, and when compression is unwarranted to send the data to a first selected storage location, when compression is warranted to determine an appropriate compression technique that satisfies the analytical model and computer readable program code to send the compressed data to a second selected storage location, wherein the first and second selected storage locations are a part of a shared pool of resources and selected from the group consisting of: different storage locations in the shared pool, and the same storage location in the shared pool.

15. The computer program product of claim 14, further comprising computer readable program code to select and apply a compression technique to the data, and wherein the program code is delivered as a service over a network and resides in a location with respect to a shared pool of resources selected from the group consisting of: local, remote, and a combination thereof.

16. The computer program product of claim 15, further comprising a first application of program code local to a client machine in communication with the shared pool of resources over the network and a second application of program code remote from the client machine, the first and second applications of program code to cooperatively compress the evaluated data.

17. The computer program product of claim 14, further comprising computer readable program code to profile each prior data format selection and data storage location, and to quantify a cost component to the profiled data and to store the profile in a data structure.

18. The computer program product of claim 17, further comprising computer readable program code to employ the quantified cost component of one or more stored profiles as a factor in evaluation of the processed data and selection of a storage format and location, and wherein the quantified cost component includes a compression ratio of the data, storage location of data, and retrieval costs of the stored data.

19. The computer program product of claim 14, wherein the overall cost associated with storage of the data, includes a cost of transferring the data between the client machine and a shared pool of configurable computer resources and a cost of compressing and decompressing the data.

* * * * *